US007296671B2

(12) United States Patent
Pietz

(10) Patent No.: US 7,296,671 B2
(45) Date of Patent: Nov. 20, 2007

(54) DRIVE SYSTEM FOR ESCALATORS OR MOVING WALKWAYS

(75) Inventor: Alexander Pietz, Berlin (DE)

(73) Assignee: KONE Corporation, Helsinki (FI)

( * ) Notice: Subject to any disclaimer, the term of this patent is extended or adjusted under 35 U.S.C. 154(b) by 343 days.

(21) Appl. No.: 10/971,789

(22) Filed: Oct. 25, 2004

(65) Prior Publication Data

US 2005/0061609 A1 Mar. 24, 2005

Related U.S. Application Data

(63) Continuation of application No. PCT/EP03/04172, filed on Apr. 22, 2004, and a continuation-in-part of application No. 10/728,852, filed on Dec. 8, 2003, now Pat. No. 6,874,613, which is a continuation of application No. PCT/EP02/05409, filed on May 15, 2002, and a continuation-in-part of application No. 10/693,825, filed on Oct. 27, 2003, now Pat. No. 6,892,874, which is a continuation of application No. PCT/EP02/04499, filed on Apr. 24, 2002, and a continuation-in-part of application No. 10/464,555, filed on Jun. 19, 2003, now Pat. No. 6,988,608, which is a continuation of application No. PCT/EP01/13895, filed on Nov. 28, 2001.

(30) Foreign Application Priority Data

| | | |
|---|---|---|
| Dec. 21, 2000 | (DE) | 100 63 844 |
| Apr. 27, 2001 | (DE) | 101 20 767 |
| Jun. 6, 2001 | (DE) | 101 27 587 |
| Apr. 25, 2002 | (DE) | 102 18 372 |

(51) Int. Cl.
*B65G 23/02* (2006.01)

(52) U.S. Cl. ........................................ 198/330; 198/334

(58) Field of Classification Search ................ 198/321, 198/322, 323, 330, 334
See application file for complete search history.

(56) References Cited

U.S. PATENT DOCUMENTS

| | | | |
|---|---|---|---|
| 5,697,486 | A | 12/1997 | Krampl |
| 6,016,902 | A | 1/2000 | Kwon |

(Continued)

FOREIGN PATENT DOCUMENTS

| | | |
|---|---|---|
| DE | 18 92 806 | 5/1964 |

(Continued)

OTHER PUBLICATIONS

Klepzig Fachberichte 79 (1971), H 8, pp. 437-439, “Bewegungsprobleme bei grossgliedrigen Kettentrieben”.

*Primary Examiner*—James R. Bidwell
(74) *Attorney, Agent, or Firm*—Venable LLP; Robert Kinberg; Steven J. Schwarz

(57) ABSTRACT

A drive system for escalators having steps or moving walkways having pallets includes at least one drive motor. A drive chain is driven by the drive motor and is comprised of a plate link chain. The drive chain has such a pitch that a maximum of two links are used for each step or pallet. A mechanism for minimizing a polygon effect which occurs during entry and reversing of the chain at a reversing element includes at least one device for actuating one of the drive motor, the reversing elements or the drive chain with a non-constant rotational speed or velocity.

17 Claims, 8 Drawing Sheets

U.S. PATENT DOCUMENTS

| | | | | |
|---|---|---|---|---|
| 6,351,096 | B1 | 2/2002 | Jang | |
| 6,450,317 | B1 * | 9/2002 | Fargo et al. | 198/330 |
| 6,832,678 | B2 * | 12/2004 | Ogura et al. | 198/322 |
| 2002/0153224 | A1 | 10/2002 | Pietz | |

FOREIGN PATENT DOCUMENTS

| | | | |
|---|---|---|---|
| DE | 74 29 118 | | 12/1974 |
| DE | 197 08 709 | | 3/1998 |
| DE | 199 36 742 | | 2/2001 |
| DE | 199 58 709 | | 6/2001 |
| EP | 0 711 725 | A1 | 5/1996 |
| GB | 2 243 430 | A | 10/1991 |

* cited by examiner

DRIVE SYSTEM FOR ESCALATORS OR MOVING WALKWAYS

CROSS-REFERENCE TO RELATED APPLICATION

This application is a continuation of International Patent Application No. PCT/EP03/04172 filed Apr. 22, 2004, designating the United States and claiming priority from German Patent Application No. 102 18 372.4 filed Apr. 25, 2002.

This application is also a continuation-in-part of the following U.S. patent applications: (1) Ser. No. 10/728,852 filed Dec. 8, 2003, now U.S. Pat. No. 6,874,613 which is a continuation of International Application No. PCT/EP02/05409 filed May 15, 2002 and claiming priority from German Application No. DE 101 27 587.0 filed Jun. 6, 2001; (2) Ser. No. 10/693,825 filed Oct. 27, 2003, now U.S. Pat. No. 6,892,874 which is a continuation of International Application No. PCT/EP02/04499 filed Apr. 24, 2002 and claiming priority from German Application No. 101 20 767.0 filed Apr. 27, 2001; and (3) Ser. No. 10/464,555 filed Jun. 19, 2003, now U.S. Pat. No. 6,988,608 which is a continuation of International Application No. PCT/EP01/13895 filed Nov. 28, 2001 and claiming priority form German Application No. 100 63 844.9 filed Dec. 21, 2000.

This application is additionally related to concurrently filed and co-owned application Ser. No. 10/971,048, filed Oct. 25, 2004, now U.S. Pat. No. 7,077,257.

The disclosures of all the foregoing applications are incorporated herein by reference.

BACKGROUND OF THE INVENTION

The invention relates to a drive system for escalators or moving walkways, comprising at least one drive motor, which optionally cooperates with a gear, at least one drive chain, which is configured as a plate link chain, reversing elements for the drive chain as well as means for minimising the polygon effect, which occurs during the entry and the reversing of the chain.

In the reversing of the chains of pedestrian conveyor systems, in particular escalators and moving walkways, by means of a chain wheel, polygon and revolution effects occur which in particular adversely affect the quiet running of the escalator or moving walkway.

The polygon effect is caused by the polygonal rest of the chain on the chain wheel. With increasing rotation angle, the effective radius of the chain wheel varies, whereby the velocity of the chain oscillates between a maximum and a minimum value. When engaging the chain wheel, the chain rolls and the teeth of the chain wheel have different velocities, which cause impacts. The revolution effect is caused by the angular momentum which is transmitted from the chain wheel onto the chain links and thus onto the steps or pallets. After the chain has run out of the chain wheel, this angular momentum is temporarily maintained due to the inertia of the system, which leads to the so called curling of the chain. The angular momentum is reduced by friction in the chain respectively by impacts between chain and guiding if a chain guiding element is provided.

In a usual arrangement, where the chain wheel drive also reverses the chain, the chain is tangentially supplied to the chain wheel. Thereby, the chain wheel and the chain have different speeds upon engagement of the chain wheel. Impacts between the chain and the chain wheel are caused in the direction of the chain strand, which, in practice, can be measured as accelerations of the respective transport elements, such as for example the steps or pallets of escalators or moving walkways. Besides the generated noise, these periodically occurring impacts lead to high stresses of the chain, the chain wheel and the drive.

European Patent document EP-A 0 711 725 describes a device for guiding a band continuum of escalators or moving walkways, in which the chain rolls are guided by means of a supporting rail having a running path and by means of an equalizing rail having a running path. At the entry of a chain wheel, which reverses the band continuum, the chain rolls are guided from the linear running path of the supporting rail onto the curved running path of the equalizing rail and from there towards a tangent point into engagement with the chain wheel.

From the running path of the supporting rail to the tangent point, the chain rolls are guided into a direction orthogonal to the running direction, over a distance which is transverse to the running direction, towards the chain wheel, which is intended to have an advantageous effect on the quiet running of the band continuum. This special curve shape of the connection element furthermore is intended to help to reduce the polygon effect.

The German magazine Klepzig Fachberichte 79 (1971), H 8, M 200, pages 437 through 439, discloses movement problems of chain drives having large chain links. The article discusses consequences of the polygon effect, wherein a number of possible solution in the mechanical field are proposed. Among other things, the reversing of a chain by means of a chain starwheel with equalizing gear is proposed, wherein the chain stud maintains its horizontal displacement and velocity as long as the next roll engages, so that a complete chain link has entered the chain starwheel. Only then, is the chain link reversed.

Both of the foregoing publications describe quite extensive mechanical constructions for reducing the consequences of the polygon effect in the reversing of the chain over a reversing wheel.

It has been proposed to use plate link chains for the step or pallet band which have a greater pitch depending on the step or pallet width, for example approximately 200 or approximately 400 mm, for the purpose of optimization of the drive concep. However, it is possible that these desired greater chain pitches will cause problems with respect to the polygon effect during the reversing and possibly with respect to the synchronous drive of the handrail.

Furthermore, escalators and moving walkways are generally known for indoor use, for example in department stores or the like in which, with regard to relatively low forces, the step or pallet studs including the rollers, which cooperate with the steps or pallets, are positioned in the respective joint areas of the drive chains. However, during the reversing of the drive chains, the existing polygon effect still causes problems.

German Utility Model 18 92 806 discloses an escalator comprising circulating, endless chain bands, which are held together by individual chain links, while steps, which are hung up in step axes, are interposed. The link plates of individual chain links, which connect the chain rolls to each other, serve as a connection of the front step axes. The distance between adjacent step axes corresponds to the pitch of the steps and is a multiple of the pitch of the chain band. Three chain links for each step are represented.

German Utility Model 74 29 118 describes an improved chain drive, in particular for escalators, in which each step has at least one end articulated at a chain, joint. The chain essentially comprises a number of joints, which corresponds to the number of steps. In order to assure a correct, essentially tangential entry and exit of the chain into and out of the chain wheel, the chain is guided over at least a part of the reversing distance thereof. If only one joint is used for each step, at least two joints shall always be in engagement with each chain wheel for avoiding polygon effects.

SUMMARY OF THE INVENTION

It is an object of the invention to provide a new drive system for an escalator or a moving walkway, which can in particular be used for so-called department store escalators or moving walkways, and which essentially avoids the increased polygon effects caused by greater chain pitches, and which optionally enables a synchronous running of the associated handrail in case of a common drive.

The above and other objects are achieved according to the invention by the provision of a drive system for escalators having steps or moving walkways having pallets, comprising: at least one drive motor; at least one drive chain driven by the drive motor and comprised of a plate link chain, the drive chain having such pitch that a maximum of two links are used for each step or pallet; at least one reversing element for the drive chain; and means for minimizing a polygon effect which occurs during entry and reversing of the chain at the at least one reversing element, the means for minimizing including at least one device for actuating one of the drive motor, the least one reversing element or the drive chain with a non-constant rotational speed or velocity.

The object of the invention is thus achieved in that the drive chain has such a pitch, that a maximum of two links are used for each step or pallet, and that the means is formed by at least one device, by means of which the drive motor or the reversing element or elements can be actuated with a non-constant speed.

The polygon effects, which are generated due to the increased chain pitches of the step or pallet chain, and which adversely affect the reversing element(s) configured as chain wheel and possibly also the handrail wheel, are eliminated by the subject of invention, in that the polygon effect is largely minimised, even with greater chain pitch.

The means can be formed by a power supply unit, in particular a frequency converter, which acts upon the drive motor, such that a non-constant speed is generated.

Another possibility is to form the means by at least one gear pair having a variable reference or pitch circle diameter, by means of which at least the reversing element(s) of the step or pallet band can be driven with a non-constant speed. Optionally, the respective handrail can also be driven with a non-constant speed at the handrail drive wheel.

Finally it is possible to configure the means, such that a guiding path is placed upstream of the respective reversing element for the step or pallet ban. The guiding path enables a guidance of the chain links or the rollers/chain rolls, which cooperate with the chain, to a pre-determinable extend, with respect to the direction of movement, out of their linear direction before entering the reversing element. This is realized upwards or downwards. This measure generates unequal speeds before the reversing element, by means of which the polygon effects are largely eliminated, when the chain runs into the respective reversing element.

The subject of invention provides different possibilities reducing the undesired polygon effect, even with greater chain pitch. The person skilled in the art would select the suitable means (electrical or mechanical) for the respective application.

Chain pitches, which actually correspond to the state of the art, are about 133 mm for usual step or pallet tread lengths of about 400 mm.

The number of peripheral teeth (z) of the reversing elements is adapted thereto, for example with $z=17$, but it can also be different depending on the diameter of the respective reversing element. Due to the high elasticity of the drive chain, the polygon effect can be practically neglected in the dimensioning of the chain, if $z \geqq 19$ and if smaller pitches are provided at higher velocities. However, chain wheels having $z<17$ should only be provided for manual operation or for slowly running chains.

The chain pitch can be principally enlarged in two steps. Under the same conditions (step or pallet tread length of about 400 mm) another possible chain pitch would be 200 mm, on the one hand, and 400 mm, on the other hand, i.e. two links for each step or pallet or one link for each step or pallet. The corresponding teeth numbers of the reversing elements to be used, in particular of the chain wheels, are in this case only about $z=12$ or $z=6$ (depending on the diameter of the reversing element).

The subject of invention can be principally used for all types of escalators or moving walkways, but preferably for the drive chain of an escalator or a moving walkway, which can be used in the interior of buildings. Thus, it is not only the effect of the greater chain pitch, but just the combination of the same one with suitable measures for reducing the polygon effect, which leads to an economically interesting solution, in particular for drives of department store escalators and moving walkways.

BRIEF DESCRIPTION OF THE DRAWINGS

An exemplary embodiment of the invention is described below in conjunction with the accompanying drawings, wherein.

DETAILED DESCRIPTION OF THE INVENTION

Figure 1:
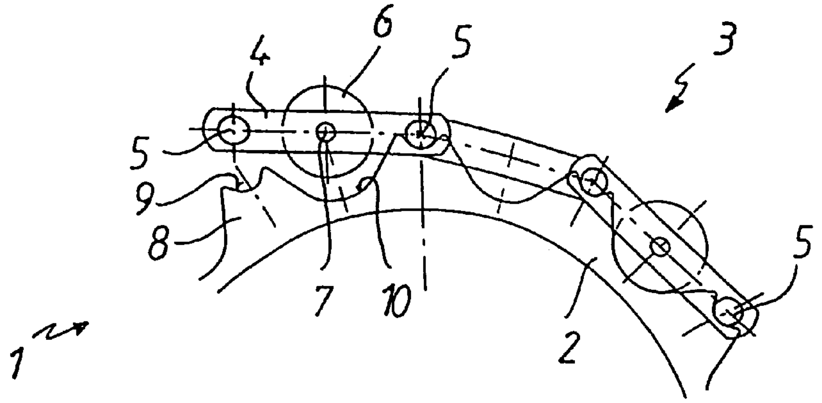
FIG. 1 is a schematic which shows a drive chain for an escalator in the entry area of a reversing element.

FIG. 1 is a schematic diagram of a drive system 1 according to an embodiment of the invention, comprising a reversing element 2, which is configured as a chain wheel, as well as a drive chain 3. The drive chain 3 comprises a plurality of interconnected plate links 4, which are connected to each other via joints 5. Rollers 6 extend at about half height between the joints 5 which are in active relation with steps (not shown) of an escalator (not shown) via step bolts 7. The reversing element 2 has chain teeth 8, which are adapted to the pitch of the drive chain 3 in a correspondingly reduced manner. In this example, a step tread length of 400 mm shall be assumed. The chain pitch shall be 200 mm, which results in a number of teeth of the reversing wheel of z=12. Other parameters with respect to the tread length require other chain pitches respectively other numbers of teeth.

On the chain side, the chain teeth 8 are provided with recesses 9, which serve for receiving the joints 5, while the rollers 6 are positioned in corresponding recesses 10 of the reversing wheel 2. Depending on the design of the drive system 1, it can be useful to guide the rollers 6 around the reversing element 2 in a relatively pressure relieved manner. This can be realized in a simple manner, in that the recesses 10 are a little larger than the roller diameter, so that the roller comes into contact with the corresponding wall areas of the recesses 10 only partially or do not come into contact with them at all.

Figure 2A:
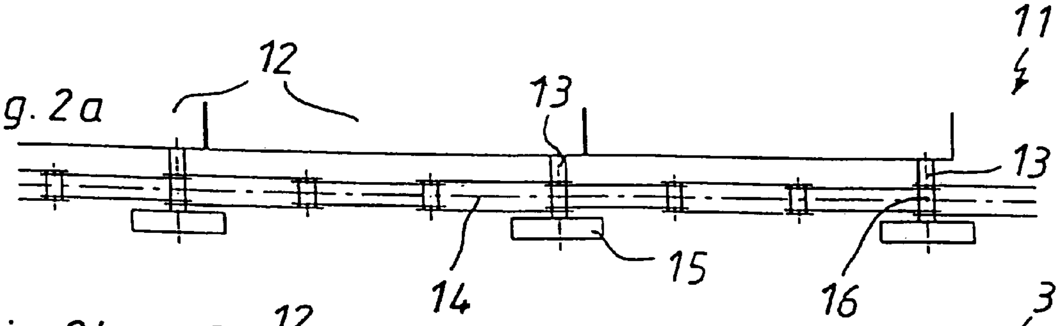
FIG. 2*a* is a schematic which shows a drive chain for an escalator having an outside roller according to the state of the art.

FIG. 2*a* shows a drive system 11, which represents the state of the prior art, which is used for an escalator. Steps 12 cooperate with rollers 15 provided outside the drive chain 14 via step bolts 13. Herein, the step bolts 13 extend through the joints 16 of the drive chain 14. For an assumed tread length of about 400 mm, a chain pitch of 133 mm results, such that three links of the drive chain 14 are associated with each step 12.

Figure 2B:
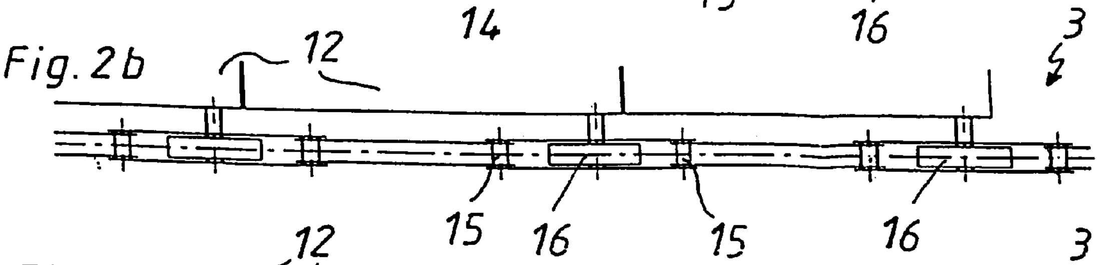
FIGS. 2*b-d* are schematics which show drive chains according to the invention with different pitches for the application according to FIG. 1.
Figure 2C:
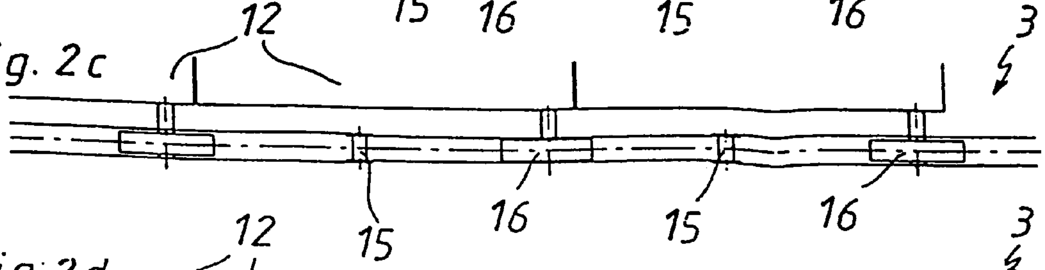
Figure 2D:
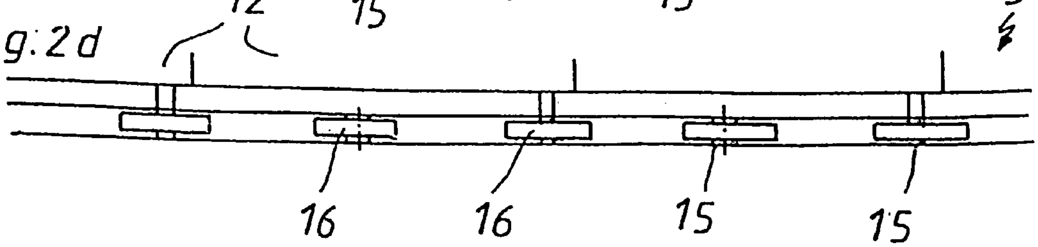

FIGS. 2*b*-*d* show the drive chain 3 according to embodiments of the invention and according to FIG. 1. In contrast to the drive chain 14 according to FIG. 2*a*, the rollers 6 are positioned between the joints 5 (FIGS. 2*b*, 2*c*) of the drive chain 3 and connected to the respective step 12 via the step bolt 16. Such drive chains shall be used for so-called heavy load escalators. FIG. 2*d* shows a drive chain 3, which shall be used in so-called department store escalators, wherein the rollers 15 are positioned in the area of the joints 5. Here, also a greater pitch is provided.

FIG. 2*b* shows a drive chain 3 with a pitch of 200, i.e. two links of the drive chain 3 are provided for each step, whereas FIG. 2*c* shows a drive chain 3 with a pitch of 400 and rollers 6, which are placed inside and positioned between the joints 5 of the drive chain 3. Due to this concrete allocation of the chain pitch of the drive chain 3 in active relation with the reversing element 2, the number of teeth of which is adapted thereto, the drive system can be preferably used for department store escalators.

FIG. 2*d* shows a drive chain 3, which also has a greater chain pitch in comparison to FIG. 2*a*. Herein, the rollers 6 are provided in the area of the joints 5. Such drive chains 3 can be used for so-called department store escalators because of their light construction style. The polygon effects, which are increased due to the greater chain pitch, are reduced by the measures described in the following Figures, such that a lower cost of acquisition is advantageously obtained for the drive chain because of the greater chain pitch and simultaneously the transport comfort is considerably increased by minimizing the polygon effect.

Figure 3:
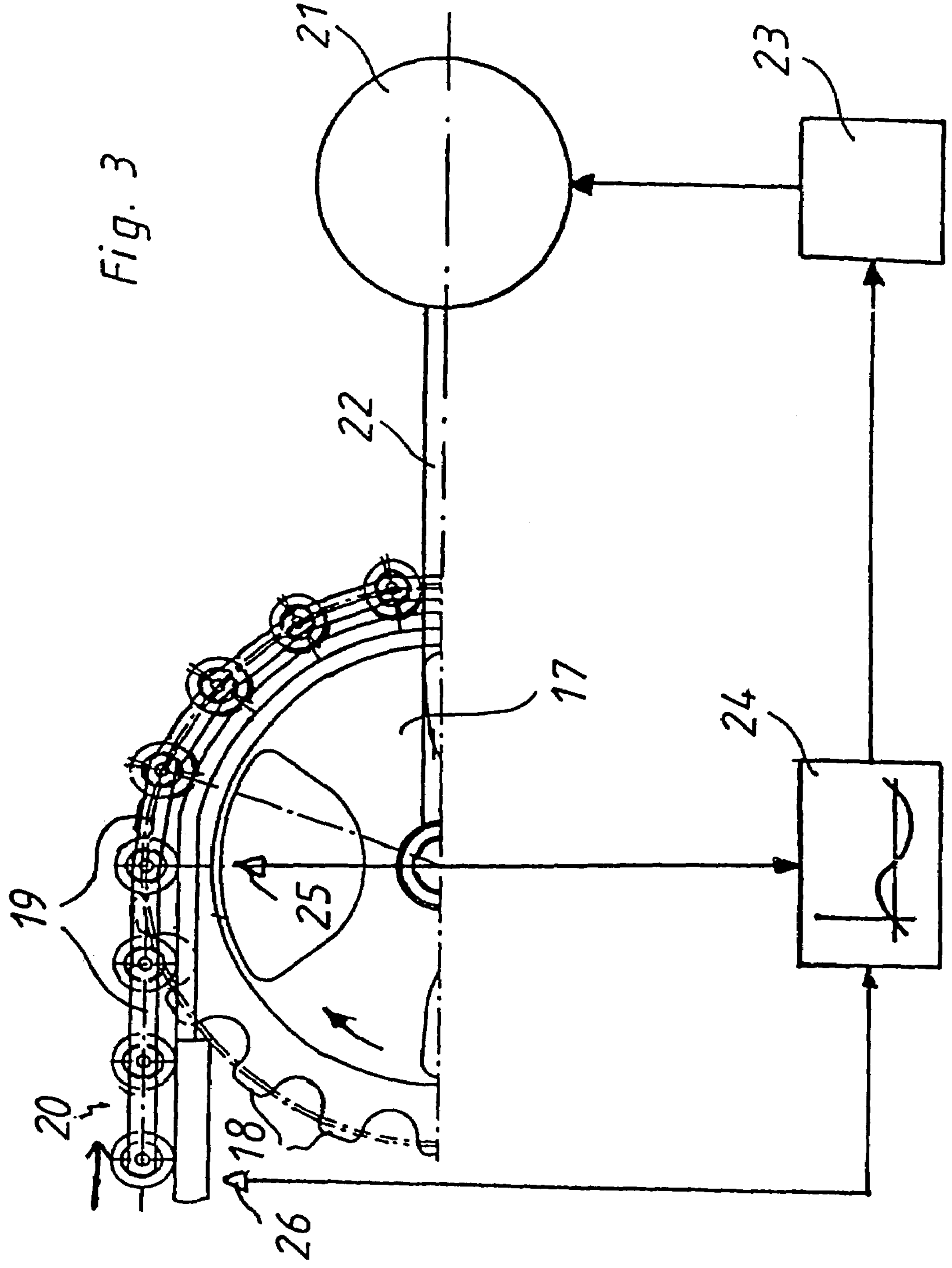
FIG. 3 is a schematic and partial block diagram according to FIG. 2*b*-2*d* in connection with a mechanism for reducing the polygon effect, here in form of a frequency converter.

FIG. 3 shows a schematic diagram of a pedestrian conveyor system, for example an escalator. Shown are a reversing wheel 17, which is equipped with several teeth 18, a plate link chain 20 composed of several links 19, as well as an electric drive motor 21, which optionally is in active relation with a gear (not shown). The connection between the drive motor 21 and the reversing wheel 17 is assured by the drive member 22. The direction of movement of the chain 20 and the reversing direction of the reversing wheel 17 is indicated by arrows. The polygon effects, that occur during the entry of the chain 20 into the reversing wheel 17 are reduced according to the invention by superimposing a different rotational speed upon the rotational speed of the drive motor 21. The reversing wheel 17 is thus made to rotate with a non-constant rotational speed, which almost corresponds to the mathematical function of the chain 20 when running into the reversing wheel 17, whereby the impacts, which are caused by the polygon effect in the whole system, are minimized.

This superposition is achieved by a frequency converter 23 in active relation with the drive motor 21. Frequency converter 23 drives the drive motor 21 so that drive motor 21 rotates with a non-constant rotational speed and this non-constant rotational speed is transmitted to reversing wheel 17 in a superimposing way via the drive member 22. In a control unit 24 several driving parameters can be stored, which include the basic patterns of already existing escalators or moving walkways, so that these basic settings can be used for standard designs.

To increase the comfort further, it is possible to detect the phase position of reversing wheel 17 by means of a sensor 25 and to transmit this phase position to control unit 24. Another parameter can be the velocity of chain 20, which is for instance measured by another sensor 26, wherein also these measured values are transmitted to control unit 24. By means of a corresponding equalization of the values measured by the sensors 25, 26 in comparison with the existing basic patterns, the frequency converter 23 can be supplied with electric values so that the drive motor 21 can be continuously adapted to, for example, different rotational speeds of the chain 20.

Besides reducing the polygon effect, these embodiments of the invention considerably improve the quiet running of the pedestrian conveyor system, without requiring modifications in the mechanical arrangement. Manufacturing tolerances of the reversing wheel 17 and/or the chain 20 can be stored by interpolation of the control unit 24 and the frequency converter 23, respectively, wherein the monitoring of the phase angle of the reversing wheel or the velocity of the chain offers further possibilities of intervention, which in particular have positive effects when the transport velocity varies between 0 and the maximum.

Figure 4:
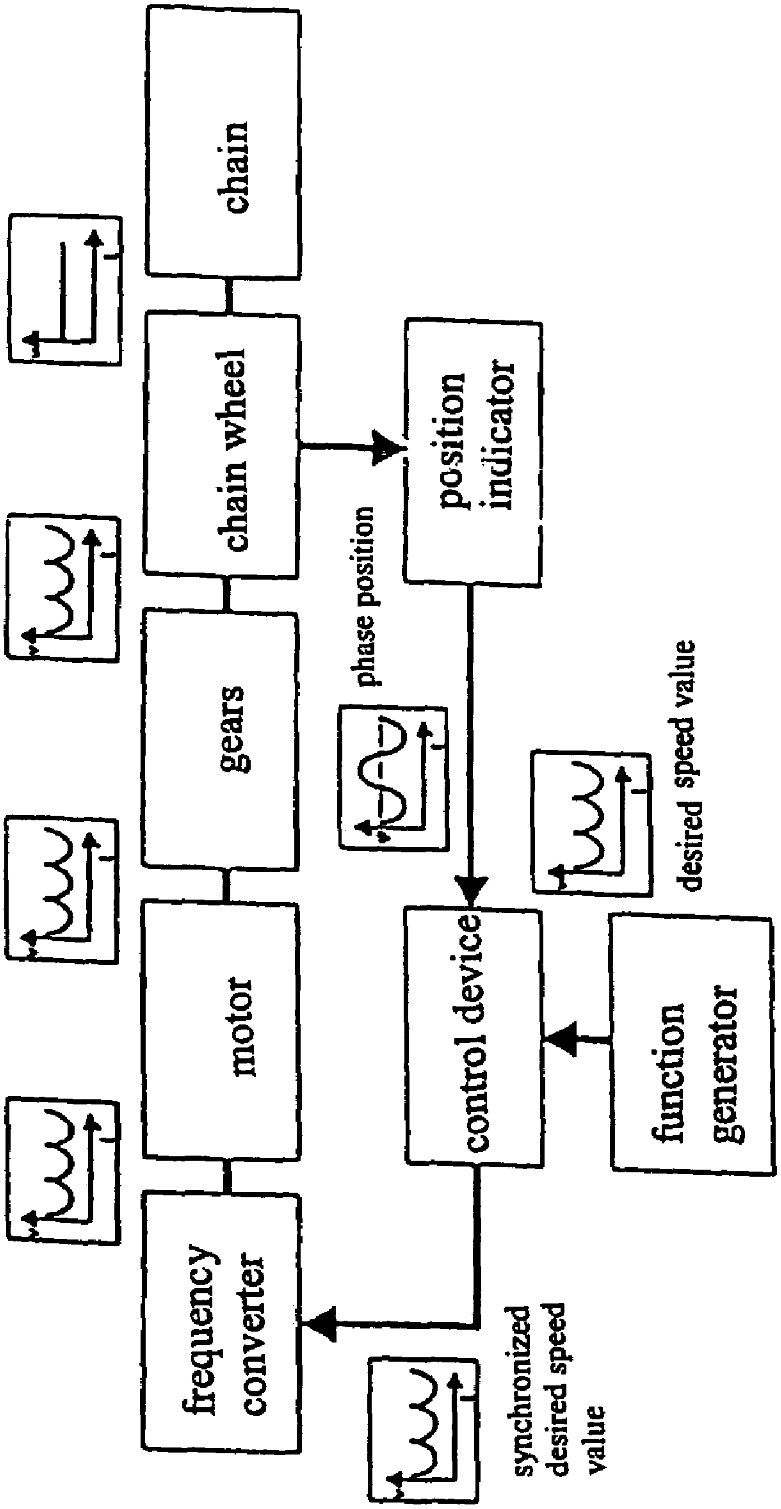
FIG. 4 is a functional block diagram of the system structure according to FIG. 3.

FIG. 4 is a schematic representation of the system, by means of which the polygon effect of a chain wheel system can be positively influenced in the drive, such that the quiet running of an escalator or moving walkway is improved. In the individual boxes, the elements are mentioned which are in active relation with each other, i.e. the chain, the chain wheel (reversing wheel), the gear, the motor as well as the frequency converter. In the interfaces between chain and chain wheel, chain wheel and gears, gears and motor as well as motor and converter, the respective speed values are represented with respect to time. A position sensor is associated with the chain wheel, which sensor detects the position of the respective reception caps, which are formed between two chain teeth of the chain wheel, and thus determines the phase position. The value of the respective phase position of the chain wheel is supplied to a downstream control unit, which is in active relation with a function generator. The function generator includes the mathematical function(s) of the chain upon entering the chain wheel in the form of indexed values of desired rotational speed, so that only a comparison of the transmitted specific phase position of the chain wheel with the given index value of rotational speed needs to be carried out within the control unit. The converter is then supplied with the respective synchronized desired value of rotational speed, such that a corresponding rotational speed can then be superimposed upon the chain wheel via the motor and gear. In contrast to the state of the art, a position dependent control of the speed is realized, whereby the quiet running of the pedestrian conveyor system can be considerably increased. As already mentioned, chains having a pitch of up to 200 mm or even up to 400 mm can be realized with a corresponding reduction of the number of peripheral teeth of the chain wheel to beneath z=17.

Figure 5:
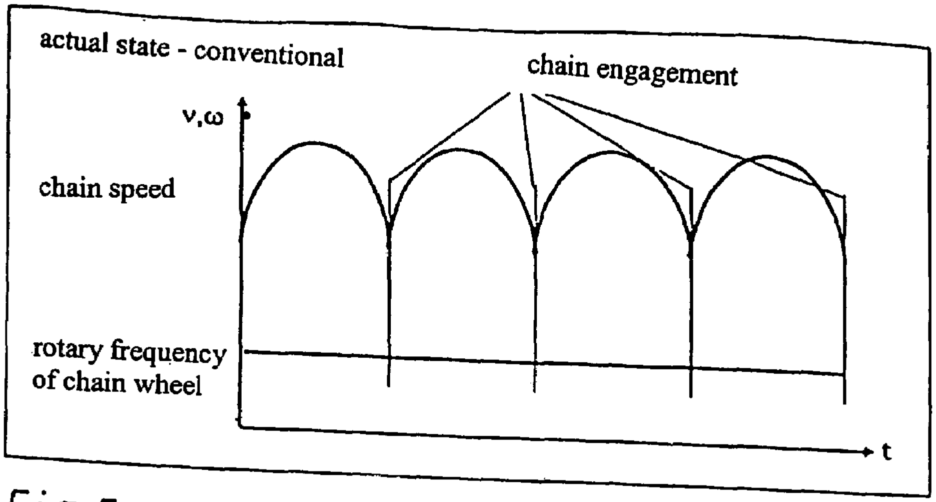
FIGS. 5-7 are comparative representations of a conventional drive concept and the subject of invention according to FIG. 3.
Figure 6:
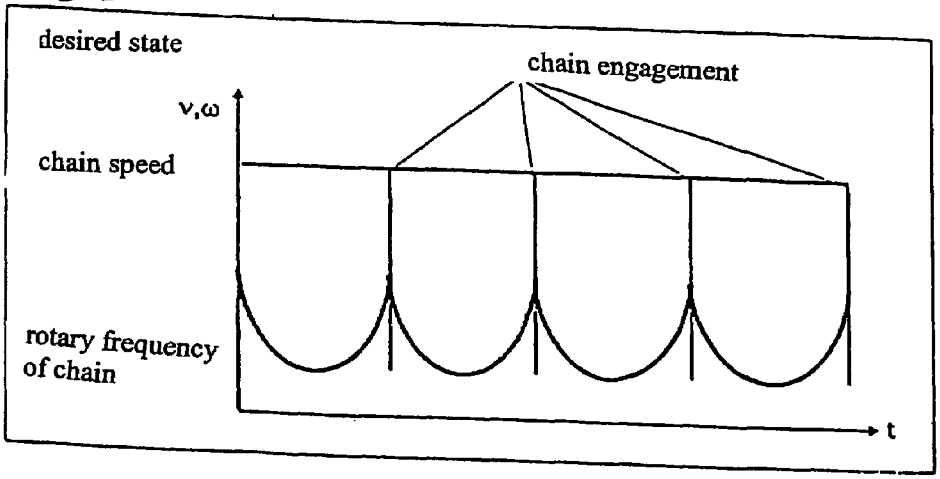
Figure 7:
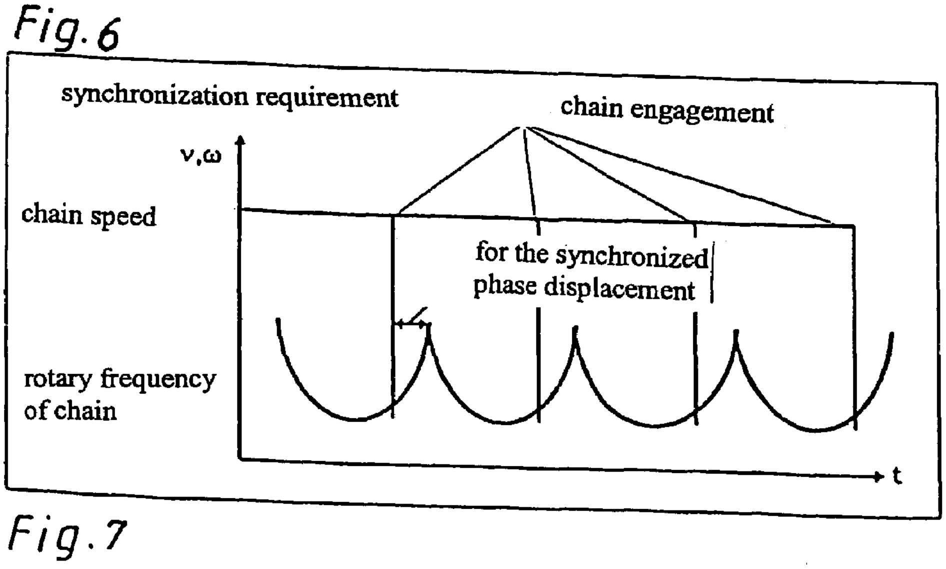

FIGS. 5 through 7 show comparative examples of a conventional drive (FIG. 5) with the desired state in the correct phase position (FIG. 6), on the one hand, as well as of the synchronization requirement (FIG. 7).

The speed of the chain as well as the rotation frequency of the chain wheel are represented with respect to time. In the conventional state of the art, the rotation frequency of the chain wheel is constant, whereas the speed of the chain is a curve shaped function and the respective engagement of the chain in the chain wheel, which rotates with a constant rotation frequency, has to be considered as non-constant.

FIG. 6 shows a possibility to realize the invention, namely to keep the speed of the chain constant, whereas the rotation frequency of the chain wheel is a curve shaped function, seen over the time. However, other possibilities can also be considered.

The synchronization requirement is represented in FIG. 7, wherein the phase displacement to be synchronized is stored as a mathematical function in the function generator and transmitted to the control unit. Then, the control unit only determines the deviation of the phase position of the chain wheel, which has been transmitted by the position sensor, in comparison to the indexed value of rotational speed, wherein the phase displacement to be synchronized can then be transmitted as a synchronized index value of rotational speed to the converter and thus, via motor and gear, to the chain wheel.

Figure 8:
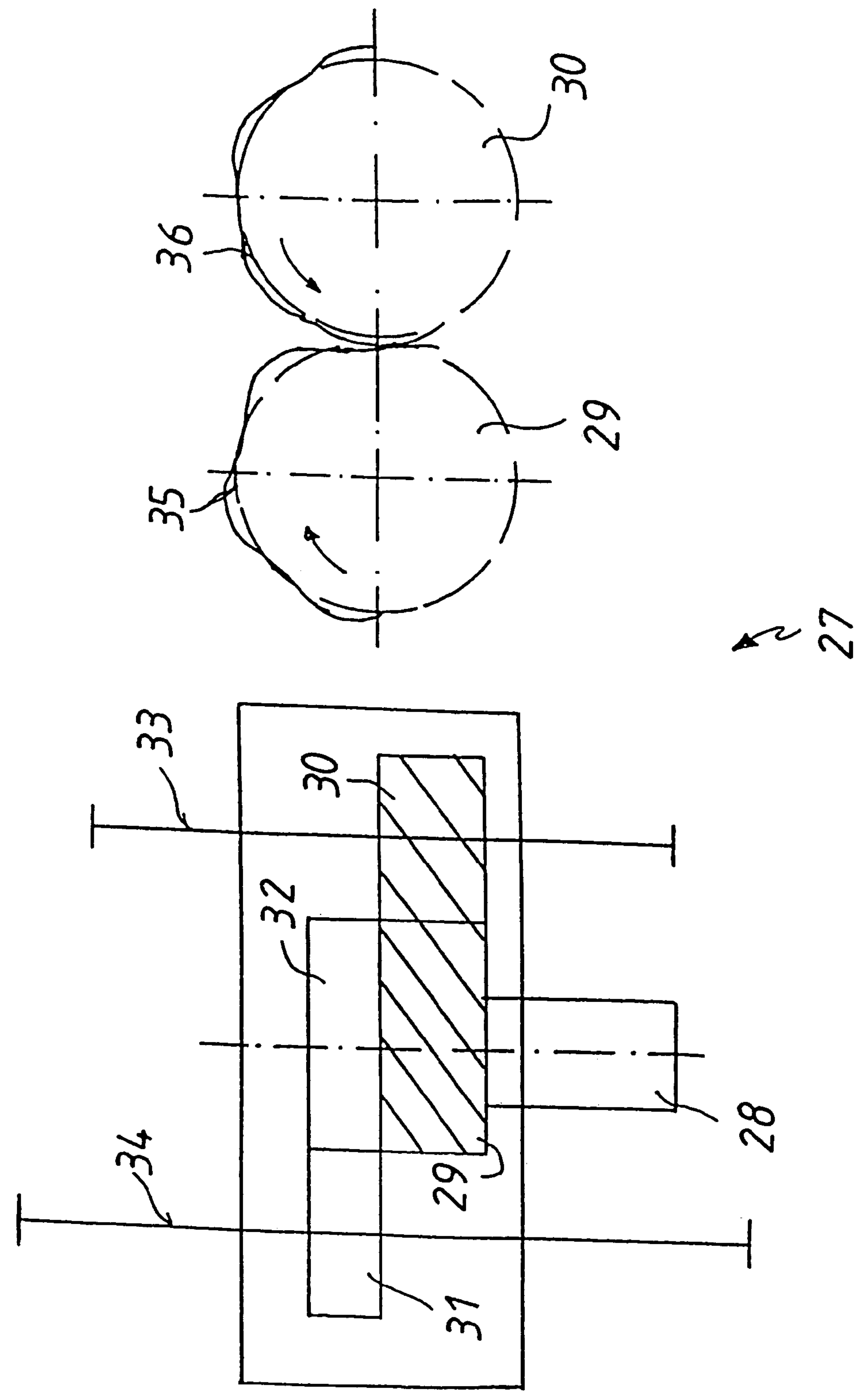
FIG. 8 is a schematic of an escalator drive comprising a combinable step and handrail drive.

According to a further embodiment of the invention, there is shown in FIGS. 8*a* and 8*b* a power divider gear 27 for an escalator (not shown). A drive 28 composed of a motor and optionally a reducing gear is placed upstream of the power divider gear 27. Gearwheels 29, 30, 31, 32 are provided within the power divider gear 27, wherein the gearwheels 30 and 31 act upon a step chain wheel shaft 33, on the one hand, and on a handrail drive shaft 34, on the other hand.

According to this embodiment of the invention, the gear pair 29, 30 on the side of the step chain wheel is provided with a variable pitch circle diameter 35, 36, wherein the variable pitch circle diameter 35, 36 varies between a minimum and a maximum value on the perimeter as far as the chain wheel (not shown) has teeth. The gear pair 29, 30 then generates a defined irregularity, only on the side of the step chain wheel shaft 33, whereas the rotational speed of the handrail drive shaft 34 remains constant in this example. This drive concept is preferably used, if an enlarged chain pitch (dependent on the step width) of for example 200 or 400 mm is required, which, in case of a uniform drive speed of the drive motor 28, requires a different compensation of the polygon effect, in order to nevertheless obtain a simultaneous rotation of the step or chain wheel shaft 33 and the handrail drive shaft 34.

Figure 9:
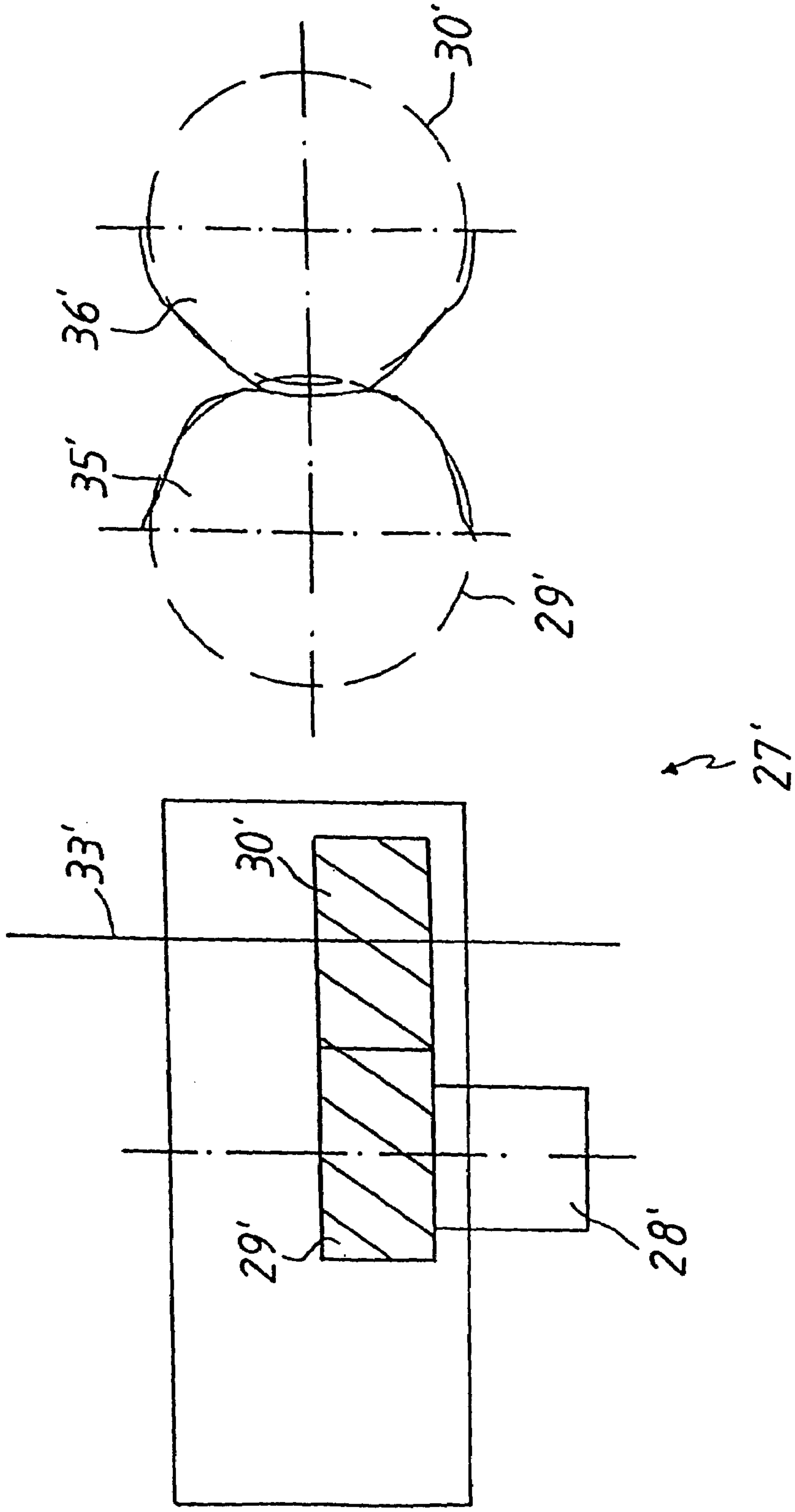
FIG. 9 is a schematic of the drive of a moving walkway, in particular for the pallet band.

According to the embodiment shown in FIGS. 9*a* and 9*b*, a gear 27' is in active relation with a drive motor 28' for use in a moving walkway (not shown). Gearwheels 29', 30' are arranged within the gear 27', wherein the gearwheel 30' forms the drive in the direction of a pallet chain wheel shaft 33'. According to this embodiment of the invention, the gear pair 29', 30' on the side of the pallet chain wheel is provided with a variable pitch circle diameter 35', 36'.

Figure 10:
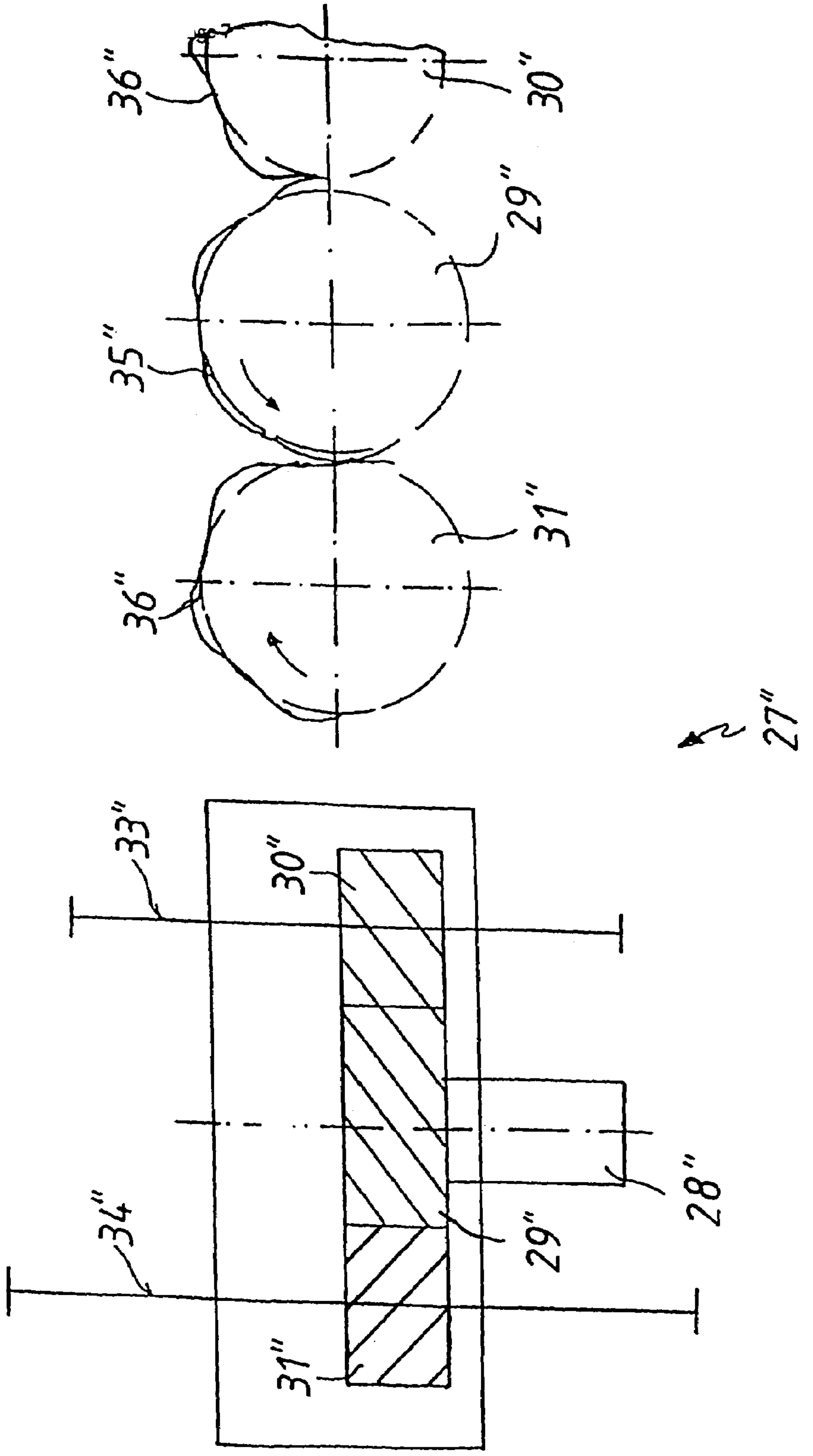
FIG. 10 is a schematic of another embodiment the drive of an escalator comprising a combinable step and handrail drive.

FIGS. 10*a* and 10*b* show an embodiment of the invention wherein there is shown an alternative drive of an escalator with respect to FIGS. 8*a* and 8*b*. A power divider gear 27" is in active relation with a drive motor 28". The gear 27" comprises gearwheels 29", 30", 31". The gearwheel 30" forms the drive of the step chain wheel shaft 33". In contrast to FIGS. 8*a* and 8*b*, the handrail drive shaft 34" is also driven with an irregular displacement via the gearwheel 31". The oscillations, which are thereby generated in the area of the handrail (not shown), are so small, that the user of the escalator will not feel any discomfort. In comparison to FIGS. 8*a* and 8*b*, the reduction of the gear parts leads to further cost saving. The pitch circle diameters 35", 36" are indicated.

Figure 11:
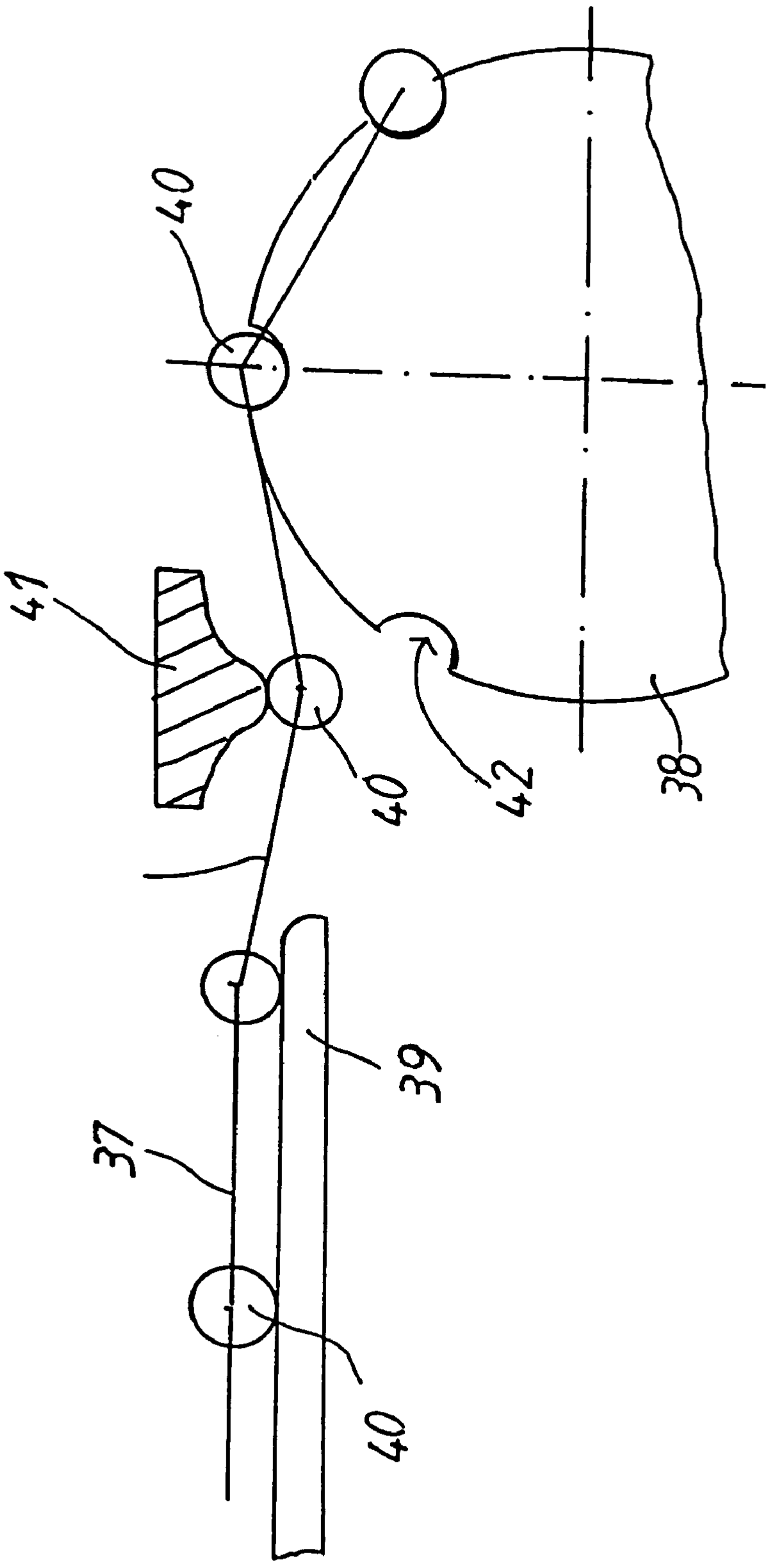
FIG. 11 shows an alternative mechanical embodiment for reducing the polygon effect.

FIG. 11 shows yet another mechanical embodiment of the invention for minimizing the polygon effect in drive chains having a greater chain pitch. Only the basic structure is represented. One can see a drive chain 37, a reversing element 38 as well as a guiding path 39 upstream of the reversing element 38 for precisely guiding the rollers 40 of the drive chain 37 out of their linear direction. In this embodiment, a downward deviation of the rollers 40 is indicated, wherein an upward deviation is also possible. For this purpose, the guiding path 39 cooperates with a curve element 41 of pre-determinable contour, the form of which will be adapted to the respective application by the person skilled in the art. By guiding the roller 40 out of its linear direction, which afterwards engages in the reversing element 38, the drive chain 37 is shortened in this area. Dependent on the phase position of the reversing element 38, the speed of the chain band is influenced due to angle and radii modifications. Deviations from the desired constant speed occur. According to the actual state of the art and to practical use, the drive chain 37 is guided over a guiding path 39, which has an almost constant curve shape, before running into the reversing element 38. Contrary to this, the subject invention takes advantage of the fact, that the position(s) of the upstream roller(s) 40 is/are influenced, as a function of the phase position of the reversing element 38. In such positions, in which a high speed is geometrically determined by the engagement in the reversing element 38, at least one of the rollers 40 shall be influenced in its position by the curve element 41, such that a speed variation (positive or negative) is obtained, which altogether reduces the speed variations upon engagement in the reversing element 38 or the guiding groove 42 and thus reduces the polygon effect.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A drive system for escalators having steps or moving walkways having pallets, comprising:

at least one drive motor;

at least one drive chain driven by the drive motor and comprised of a plate link chain, the drive chain having such a pitch that a maximum of two links are used for each step or pallet;

a reversing element for the drive chain;

means for minimizing a polygon effect which occurs during entry and reversing of the chain at the reversing element, the means for minimizing including at least one device for actuating one of the drive motor, the reversing element or the drive chain with a non-constant rotational speed or velocity, wherein the device comprises a power supply unit that drives the drive motor with a non-constant rotational speed;

a control unit that cooperates with the power supply unit; and at least one sensor that detects a phase position of the reversing element and transmits measured phase values to the control unit for controlling the power supply unit.

2. The drive system according to claim 1, further including a gear cooperating with the at least one drive motor.

3. The drive system according to claim 1, wherein the power supply unit comprises a frequency converter.

4. The drive system according to claim 1, further comprising: at least one sensor that detects a velocity of the chain and transmits measured velocity values to the control unit for controlling the power supply unit.

5. The drive system according to claim 1, further comprising: a function generator in active relation with the control unit; and at least one position sensor that detects a phase position of the reversing wheel and transmits phase position values to the control unit, the control unit producing synchronized indexed values of rotational speed which are supplied to the power supply unit.

6. The drive system according to claim 5, wherein the function generator includes a mathematical function of the chain upon running into the reversing element.

7. The drive system according to claim 1, wherein the chain, as drive member of the escalator or moving walkway, comprises a pitch corresponding to half a step or pallet.

8. The drive system according to claim 7, wherein the pitch is about 200 mm.

9. The drive system according to claim 1, wherein the chain has a pitch corresponding to a complete step or pallet.

10. The drive system according to claim 9, wherein the pitch is about 400 mm.

11. A drive system for escalators having steps or moving walkways having pallets, comprising:

at least one drive motor;

at least one drive chain driven by the drive motor and comprised of a plate link chain, the drive chain having such a pitch that a maximum of two links are used for each step or pallet;

a reversing element for the drive chain;

means for minimizing a polygon effect which occurs during entry and reversing of the chain at the reversing element, the means for minimizing including at least one device for actuating one of the drive motor, the reversing element or the drive chain with a non-constant rotational speed or velocity, wherein the device comprises at least one gear pair in operative relationship with the drive motor and having a variable reference or pitch circle diameter whereby the reversing element can be driven with a non-constant rotational speed.

12. The drive system according to claim 11, further including a reversing element associated with a handrail, and wherein the gear pair is arranged for driving the reversing element associated with the handrail with a non-constant rotational speed.

13. The drive system according to claim 11, wherein the reference or pitch circle diameter of the gear pair varies between a minimum and a maximum value, seen in circumferential direction.

14. The drive system according to claim 13, wherein the variation of the reference or pitch circle diameter on the perimeter is an analogue to a number of teeth of the respective reversing element of the drive chain.

15. The drive system according to claim 1, wherein the device includes a guide path upstream of the reversing element for drive chain to guide the chain links or rollers/chain rolls, which cooperate with the chain out of a linear direction before entering the reversing element.

16. The drive system according to claim 15, wherein the chain links or the rollers/chain rolls can be deviated upwards, seen in the direction of movement.

17. The drive system according to claim 15, wherein the chain links or the rollers/chain rolls can be deviated downwards, seen in the direction of movement.

* * * * *